United States Patent [19]

Harris et al.

[11] Patent Number: 5,301,086
[45] Date of Patent: Apr. 5, 1994

[54] TERMINAL BARRIER FOR ELECTRICAL LOAD CENTERS

[75] Inventors: Michael R. Harris, Winchester; William K. Chambers, Lexington, both of Ky.

[73] Assignee: Square D Company, Palatine, Ill.

[21] Appl. No.: 36,009

[22] Filed: Mar. 23, 1993

[30] Foreign Application Priority Data

Apr. 1, 1992 [CA] Canada ............................ 2064639

[51] Int. Cl.$^5$ ............................................... H02B 1/26
[52] U.S. Cl. ........................................ 361/641; 361/657
[58] Field of Search ............................ 361/353–363, 361/372, 376

[56] References Cited

U.S. PATENT DOCUMENTS 4,159,504  6/1979  Cook ................................. 361/355
5,046,173  9/1991  Wall, Jr. ........................... 361/355

Primary Examiner—Gregory D. Thompson
Attorney, Agent, or Firm—Larry I. Golden; Kareem M. Irfan

[57] ABSTRACT

The present invention includes a terminal barrier for use in an electrical distribution load canter having a housing defined by side walls upstanding from a back wall. Within the housing are input terminals connecting a service line to a main circuit breaker and output terminals connected to a plurality of branch circuit breakers. The barrier is a generally flat, thin body positioned to separate the input terminals from the output terminals. The barrier includes interlocking elements for disengagingly connecting one end of the barrier to the side wall of the housing. The barrier also includes elements for fastening the opposite end of the barrier to the housing while simultaneously engaging the interlocking elements and supporting the barrier in a plane parallel to the back wall of the housing.

21 Claims, 2 Drawing Sheets

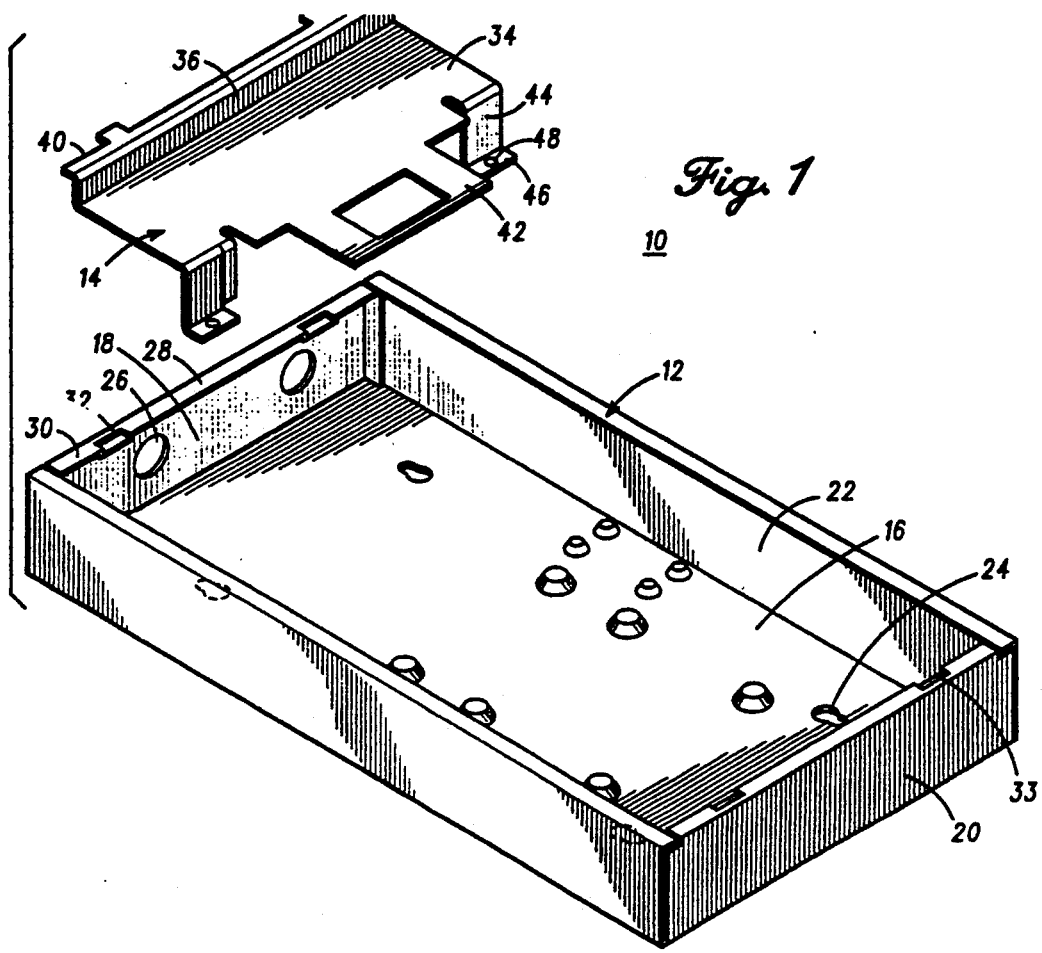
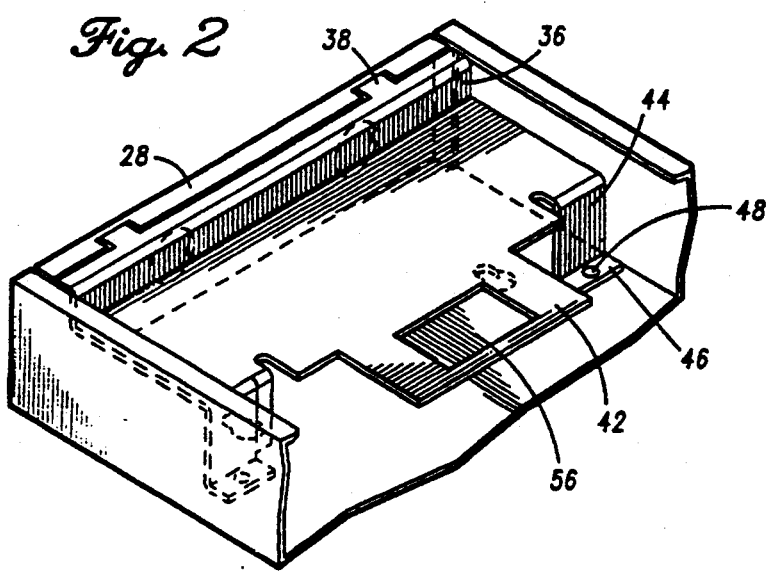

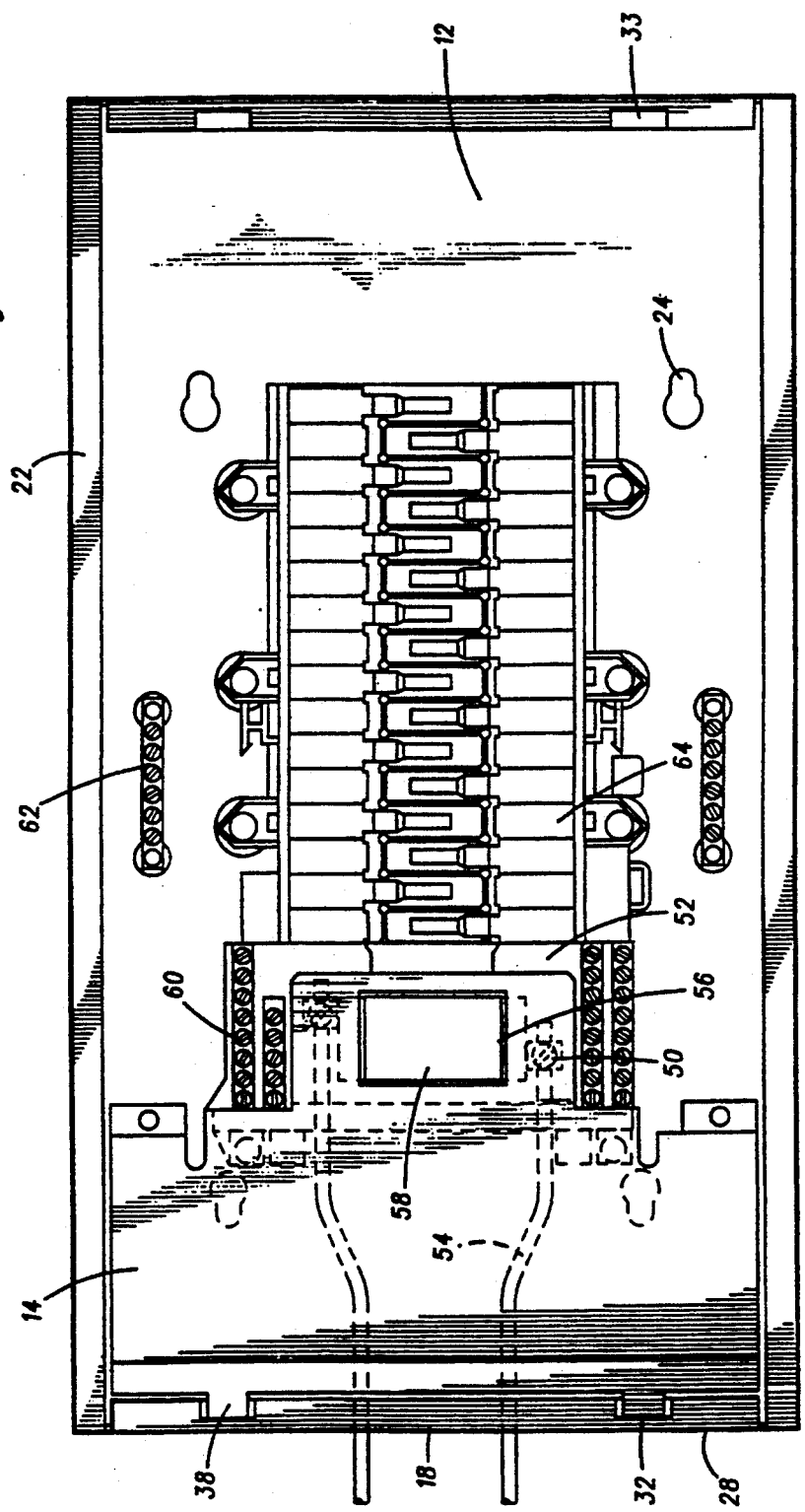

TERMINAL BARRIER FOR ELECTRICAL LOAD CENTERS

FIELD OF THE INVENTION

The present invention relates generally to electrical distribution systems and, more particularly, to a terminal barrier used in an electrical distribution load center.

BACKGROUND OF THE INVENTION

Enclosures for electrical equipment, such as circuit breaker panel boards or load centers, are designed to connect incoming service or main lines to the terminals of a main circuit breaker. The current is distributed through branch circuit breakers and output terminals to branch lines which exit the enclosure.

The standards promulgated by certain municipalities require that a removable barrier be installed between the main circuit breaker and the branch circuits in an electrical load center. Several methods are used to support this barrier which increase the cost and complexity of manufacturing, as well as, installing the enclosure.

One method of supporting the barrier requires riveting brackets to the side wall of the enclosure. Another method lances a part of the side wall flange. Both methods require multiple screws to be inserted at the factory to hold the barrier during shipping. Contending with all these parts during the subsequent installation is labor intensive.

The art needs a new and improved removable barrier to separate the input terminals from the remainder of the components in an electrical load center which is inexpensive to manufacture and easily installed. The present invention provides such a terminal barrier and load center assembly.

SUMMARY OF THE INVENTION

The present invention includes a terminal barrier for use in an electrical distribution load center having a housing defined by side walls upstanding from a back wall. Within the housing, input terminals connect a service line with a main circuit breaker and output terminals connect to a plurality of branch circuit breakers.

The barrier includes a generally flat, thin body positioned to separate the input terminals from the output terminals in the housing. The barrier also includes interlocking means for disengagingly connecting one end of the barrier to the side wall of the housing. Means for fastening the opposite end of the barrier to the housing is included while simultaneously engaging the interlocking means and supporting the barrier in a plane parallel to the back wall of the housing.

The present invention also includes an electrical distribution load center assembly. The assembly includes a housing defined by side walls upstanding from a back wall. Mounted within the housing are input and output terminals. The input terminals connect a service line to a main circuit breaker. The output terminals connect to a plurality of branch circuit breakers and outgoing lines.

The assembly includes a barrier having a generally flat, thin body positioned to separate the input terminals from the output terminals. The barrier includes interlocking means for disengagingly connecting one end of the body to the side wall of the housing, the barrier also including means for fastening the opposite end of the body to the housing while simultaneously engaging the interlocking means and supporting the barrier in a plane parallel to the back wall of the housing.

Preferably, the interlocking means includes tabs mounted to the interlocking end of the barrier and extending perpendicular therefrom to engage corresponding slots near the top of the side wall of the housing. The fastening means includes legs mounted on the opposite end of the barrier which are integrally formed with the body and extend therefrom in a perpendicular direction to about and fasten to the back wall of the housing.

One object of the present invention is to provide a removable barrier which is inexpensively and easily manufactured.

Another object is to provide a barrier which is easily and quickly installed on site.

Still another object is to provide an electrical load center utilizing a barrier which assembles with fewer parts.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure:

FIG. 1 illustrates an exploded view of a load center assembly of the present invention including a housing and a barrier for interconnecting therewith;

FIG. 2 shows a partial view of a housing which interlocks with the barrier; and

FIG. 3 shows a top plan view of the load center assembly with the barrier, input and output terminals, and main and branch circuit breakers installed in the housing.

DETAILED DESCRIPTION

Referring now to FIGS. 1 through 3, an electrical distribution load center generally designated as 10 includes a housing 12 and a barrier 14. The housing 12 is formed by a back wall 16 and side walls like 18, 20, and 22. The housing 12 is enclosed by a cover or door (not shown) which fits on top of the side walls 18. The back wall 16 includes a plurality of holes 24 which are used in surface mounting the housing 12 to a wall. Alternately, the housing 12 may be mounted to the studs in a wall or any other mounting arrangement.

The side wall 18 contains a plurality of holes like 26 to allow electrical lines to enter or leave the housing 12. The top 28 of the side wall has a flange 30 which extends perpendicularly from the top edge 28 in towards the interior of the housing 12. The flange contains at least one slot 32.

The barrier 14 has a generally flat, thin body 34 which is supported in a plane parallel to the back wall 16. Connected to one end of the body 34 is an upstanding, L-shaped flange 36 which extends across the width of the body 34. The flange 36 offsets the body 34 from any cover or door that seals to the top edge 28 of the housing.

Extending outwardly and perpendicular to the body 34 is at least one interlocking tab 38 connected to the L-shaped flange 36. The interlocking tab 38 is positioned and correspondingly shaped to engage the slot 32 on the side wall 18.

Other means to disengagingly interlock one end of the body 34 are contemplated by the present invention.

For example, the edge 40 of the L-shaped flange can be bifurcated to interleaf or sandwich therebetween the flange 30 of the side wall 18. Alternately, the interlocking tabs 38 engage a slot positioned directly in the side wall 18.

The housing 12 and the barrier 14 have cooperating interlocking elements so that the two components can be assembled merely by manipulation of the respective components. The interlocking means is designed such that the housing 12 and the barrier 14 both of which are generally rectangular, can be assembled in either of two 180 degree orientations. For example, the barrier 14 can interlock with the slots 33 located at the other end of the housing 12. Thus, connection with a service line is accommodated from either end of the housing 12.

The end 42 of the body opposite the interlocking tabs 38 includes integrally formed legs 44 which extend perpendicular to the body 34 to abut against the back wall 16 of the housing. Each leg 44 has a flange 46 connected to the end of the leg which abuts the back wall 16. The flange 46 has a hole 48 to threadingly engage a fastener such as a screw. The leg 44 supports the end 42 of the body in a parallel position to the back wall 16. When the leg 44 is fastened to the back wall 16, the interlocking tabs 38 simultaneously engage and become secured or locked within the slots 32.

Other means are contemplated by the present invention for fastening the opposite end of the body 34 to the housing while simultaneously engaging the interlocking means and supporting the body 34 in a plane parallel to the back wall 16 of the housing. For example, an L-shaped flange, similar in description to numeral 36, can extend from the opposite end 42 of the barrier to the top of the side wall 22. The L-shaped flange can then be fastened by conventional means, like a screw, to the side wall 22.

As shown more specifically in FIG. 3, the body 34 extends to cover the input terminals 50 which are electrically connected to a main circuit breaker generally designated as 52. The service or main electrical lines 54, shown in phantom, enter through the side wall 18 and extend to connect with input terminals 50. Preferably, the body 34 extends to substantially cover the incoming main lines 54 and the main circuit breaker 52. The body 34 includes an aperture 56 which allows access to operate the main breaker 52 via the handle 58.

The body 34 acts as a barrier between the input terminals 50 and the remainder of the components in the housing 12 such as neutral line connecting bars 60 and output terminals 62. Branch circuit breakers 64 are mounted within the housing 12 and are electrically connected to the output terminals 62 and subsequently to branch lines (not shown) exiting the housing 12.

Preferably, the support legs 44 have sufficient width to substantially extend between the side of the main circuit breaker 52 and the side wall 22. This provides isolation of the incoming main lines 54 from any item which might accidently drop or slide along the side wall 22 and cause an inadvertent grounding by coming in contact with the main lines 54.

The housing 12 and the barrier 14 are preferably made of a corrosion resistant zinc coated sheet metal having an electrostatically deposited paint finish. Other materials, such as plastic, made be substituted. Details for making an enclosure or housing of a plastic material are disclosed in U.S. Pat. No. 5,072,071 (commonly assigned to the Square D Company) and incorporated by reference herein. Similarly, the barrier 14 can be made by injection molding a plastic such as Noryl (a registered trademark of the General Electric Company). A suitable plastic is preferably rigid, electrically insulating, and arc or flame retardant.

While particular embodiments and applications of the present applications of the present invention has been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. A terminal barrier for use in an electrical distribution load center having a housing defined by side walls upstanding from a back wall, input terminals connecting a service line to a main circuit breaker, output terminals connected to a plurality of branch circuit breakers, the input and output terminals mounted in the housing, the barrier comprising:

a generally flat, thin body being adapted to separate the input terminals from the output terminals in the housing;

interlocking means for disengagingly connecting one interlocking end of the barrier, the interlocking end being adapted to connect to one of the side walls of the housing; and, means for fastening the opposite end of the barrier to the housing while simultaneously engaging the interlocking means and supporting the barrier, the barrier being adapted to be supported in a plane parallel to the back wall of the housing.

2. The barrier of claim 1 wherein the body further includes an aperture being adapted for access to operate the main circuit breaker therethrough, whereby the body substantially covers the remainder of the main circuit breaker.

3. The barrier of claim 1 wherein the body further includes an L-shaped flange being integrally formed and upstanding perpendicularly from the interlocking end of the barrier, the L-shaped flange extending across the length of the body.

4. The barrier of claim 1 wherein the interlocking means includes at least one tab mounted to the interlocking end of the barrier and extending perpendicularly therefrom, the tab being adapted to engage a corresponding slot near the top of the side wall of the housing.

5. The barrier of claim 1 wherein the fastening means further includes at least one leg mounted on the opposite end of the barrier to support the barrier, the barrier being adapted to be supported above the input terminals and parallel to the back wall, the leg integrally formed with the body and extending therefrom in a perpendicular direction, the leg adapted to abut the back wall of the housing.

6. The barrier of claim 5 wherein the leg further includes a flange at the leg end, the flange extending perpendicularly from the leg, the flange adapted to simultaneously abut the back wall with the leg end, the flange having a hole for engaging a fastener therethrough to secure the leg to the back wall.

7. The barrier of claim 5 wherein the fastening means further includes a second leg integrally formed with the body and perpendicularly extending therefrom to abut the back wall of the housing, one leg adapted to be positioned on each side of the main circuit breaker, each leg having sufficient width to substantially extend from the side of the main breaker to the side wall, whereby the barrier separates the input and output terminals and also separates the service line connecting to the input terminals of the main circuit breaker from the remainder of the housing.

8. The barrier of claim 1 wherein the barrier is made of metal.

9. The barrier of claim 1 wherein the barrier is made of plastic.

10. An electrical distribution load center assembly comprising:
- a housing defined by side walls upstanding from a back wall;
- input and output terminals mounted within the housing, the input terminals connecting a service line to a main circuit breaker, the output terminals connected to a plurality of branch circuit breakers;
- a barrier having a generally flat, thin body being positioned to separate input terminals from the output terminals, the barrier including interlocking means for disengagingly connecting one interlocking end of the barrier to one of the side walls of the housing, the barrier also including means for fastening the opposite end of the body to the back wall of the housing while simultaneously engaging the interlocking means and supporting the barrier in a plane parallel to the back wall of the housing.

11. The assembly of claim 10 wherein the body further includes an aperture being adapted for access to operate the main circuit breaker therethrough, whereby the body substantially covers the remainder of the main circuit breaker.

12. The assembly of claim 10 wherein the body further includes an L-shaped flange being integrally formed and upstanding perpendicularly from the interlocking end of the barrier, the L-shaped flange extending across the length of the body.

13. The assembly of claim 10 wherein the interlocking means includes at least one tab mounted to the interlocking end of the barrier and extending perpendicularly therefrom to engage a corresponding slot near the top of the side wall of the housing.

14. The assembly of claim 10 wherein the fastening means further includes at least one leg mounted on the opposite end of the barrier to support the barrier above the input terminals and parallel to the back wall, the leg integrally formed with the body and extending therefrom in a perpendicular direction to abut the back wall of the housing.

15. The assembly of claim 14 wherein the leg further includes a flange at the leg end, the flange extending perpendicularly from the leg, the flange adapted to simultaneously abut the back wall with the leg end, the flange having a hole for engaging a fastener therethrough to secure the leg to the back wall.

16. The assembly of claim 14 wherein the fastening means further includes a second leg integrally formed with the body and perpendicularly extending therefrom to abut the back wall of the housing, one leg adapted to be positioned on each side of the main circuit breaker, each leg having sufficient width to substantially extend from the side of the main breaker to the side wall, whereby the barrier separates the input and output terminals and also separates the service line connecting to the input terminals of the main circuit breaker from the remainder of the housing.

17. The assembly of claim 10 wherein one of the side walls of the enclosure further includes a flange extending the length thereof, the flange having a least one slot formed therein to engage the interlocking means of the barrier.

18. The assembly of claim 10 wherein at least one of the side walls of the enclosure further includes a flange extending the length thereof, the flange having a hole for threadingly engaging the fastening means on the barrier.

19. The assembly of claim 10 wherein the back wall of the enclosure further includes a hole for threadingly engaging the fastening means on the barrier.

20. The assembly of claim 10 wherein the barrier is made of metal.

21. The assembly of claim 10 wherein the barrier is made of plastic.

* * * * *